United States Patent Office 3,576,600
Patented Apr. 27, 1971

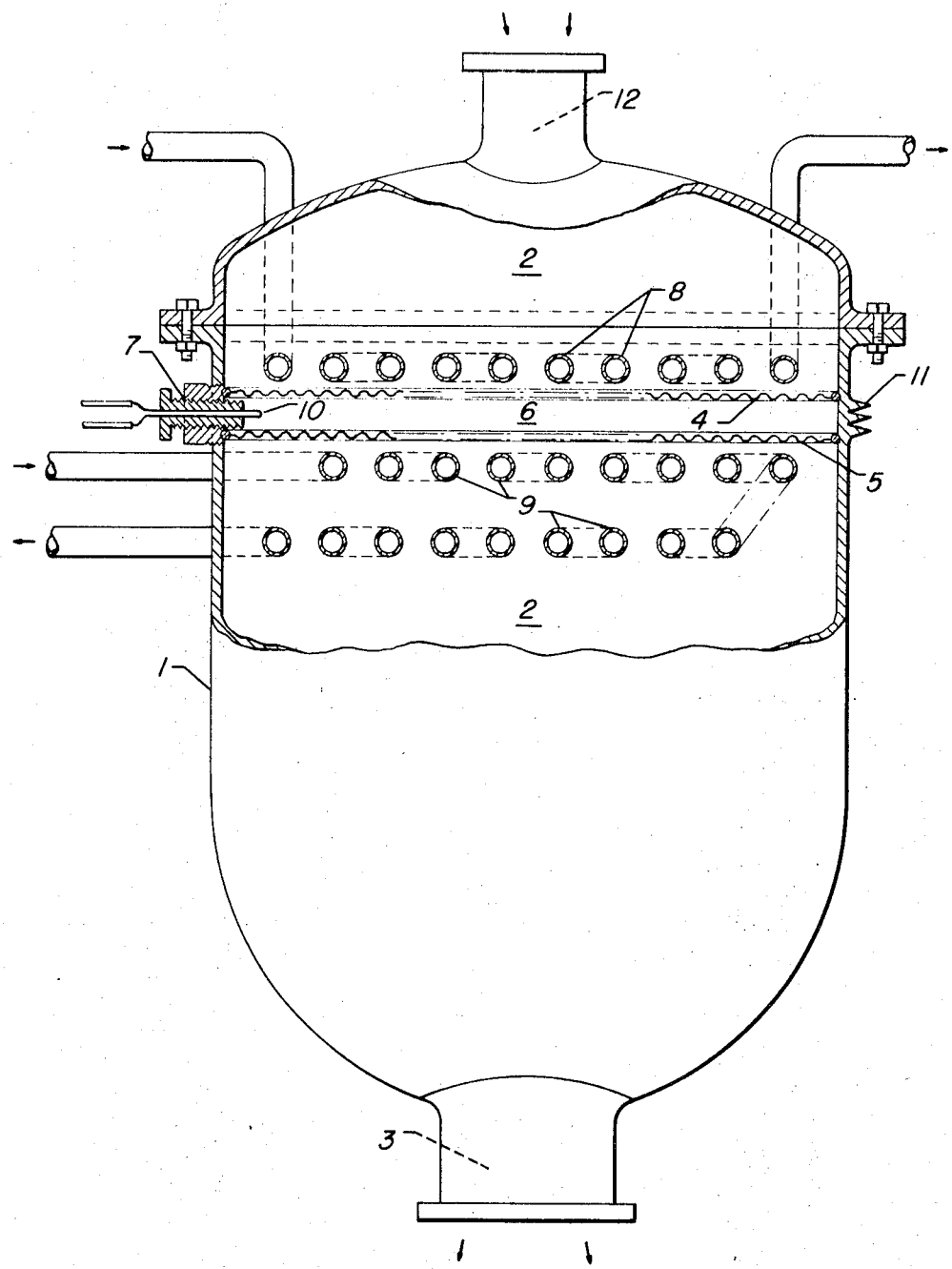

3,576,600
PROCESS FOR NONCATALYTIC PRODUCTION OF NITRIC OXIDE
Leslie C. Hardison, Norwalk, Conn., assignor to Universal Oil Products Company, Des Plaines, Ill.
Continuation-in-part of application Ser. No. 689,647, Dec. 11, 1967. This application Feb. 3, 1970, Ser. No. 8,378
Int. Cl. C01b 21/24
U.S. Cl. 23—162                                             11 Claims

ABSTRACT OF THE DISCLOSURE

The noncatalytic combustion of ammonia between heat confining screen means with a heat sink upstream and adjacent to the screen means to preclude preignition of the ammonia in the production of nitric oxide.

---

This application is a continuation-in-part of application Ser. No. 689,647 filed Dec. 11, 1967, and now abandoned.

This invention relates to the process and apparatus for the noncatalytic combustion of ammonia in the production of nitric oxide. Heretofore, the prior art on the production of nitric oxide through oxidation of ammonia has taught that such oxidation can successfully produce oxides of nitrogen, which in turn are used in the production of nitric acid, only in presence of water vapor and through the use of a catalyst. In other words, the present practice normally comprises passing a gaseous mixture of air, water vapor, and ammonia through a passageway and through a catalytic screen system within said passageway. The screen is usually of platinum or a platinum-rhodium alloy, and is intially heated in one spot to initiate the ignition of the ammonia. The process is self-sustaining once combustion begins, but it has been taught that in order for the reaction to be self-sustaining, the incoming gas mixture must be preheated to a temperature of about 700° F. before it contacts the catalytic screen. Also, it has been taught that the combustion of ammonia to form nitric oxide is impractical for commercial purposes when the ammonia-air mixture is one of explosive proportions, with the reasoning being that the ammonia will preignite at first contact with air.

Catalytic combustion of ammonia in air, while producing high yields of nitric oxide, has the disadvantage of requiring numerous layers of gauze composed of platinum or platinum-rhodium alloys. Through continued use, such layers of gauze steadily deteriorate and eventually crystallize and break to the extent that replacement is necessary. Thus, the expense of platinum is a major expense in the production of nitric oxide.

Since the state of the art presently accepts as fact that nitric oxide cannot be recovered from the combustion of ammonia when the ammonia is introduced in explosive proportions with air, the volumetric proportions of ammonia in air of from about 13.8% and above at one atmosphere pressure to about 12.4% and above at eight atmospheres pressure and higher is considered unavailable from the practical production of nitric oxide. The aforesaid percentages comprise the quantities of ammonia which must be present in an ammonia-air mixture in order for the mixture to be explosive. Because of the upper limit of ammonia imposed on the present catalytic processes by the current state of the art of nitric oxide production, the concentration of ammonia in the incoming mixture with air is usually 10.5% to 12.0% ammonia by volume.

In my invention, the combustion of ammonia takes places noncatalytically. For this reaction to be self-sustaining, the ammonia concentration of the incoming mixture of ammonia and air must be within the explosive limits at the pressure used. To render the explosive reaction useful, the combustion is confined to a specially arranged combustion enclosure which, in turn, comprises one aspect of my invention. In other words, it may be stated that my invention is the containment of the combustion within a special combustion enclosure which makes possible the feasibility of the production of nitric oxide by my method.

In a broad aspect, my invention can best be described as being a noncatalytic process for producing nitric oxide in a manner which comprises, passing a mixture containing ammonia and oxygen in explosive proportions past a radiant heat sink, said heat sink cooling the mixture to preclude premature explosion, subsequently passing said mixture through an inert heat resistant heat barrier screen having 20 to 200 openings per linear inch into a combustion enclosure, therein effecting noncatalytic burning of the mixture within said enclosure, passing the resulting nitric oxide-containing combustion products through a downstream inert heat resistant reverberatory screen having 20 to 200 openings per linear inch and out of said combustion enclosure.

In another aspect, my invention provides a combustion unit for positioning in a heat reactant stream passageway, which comprises a radiant heat sink positioned transverse to said passageway whereby heat from downstream is absorbed and precluded from passing upstream, an inert upstream screen means positioned downstream from said heat sink, said upstream screen means acting as a heat barrier, an inert downstream reverberatory screen means spaced a short distance downstream from the aforesaid upstream screen means, with said downstream reverberatory screen means also acting as a heat barrier, the two aforesaid screen means together forming a combustion enclosure, and an ignition means communicating with said combustion enclosure, whereby a flammable gas passes through said passageway and passes into and is burned in air within said combustion enclosure.

The term "inert" as used to describe the screens and screen means, should be considered as equivalent to the term "noncatalytic." In determining just what materials are included within the scope of the term "inert" or "noncatalytic," the characteristics of a catalyst must be considered. Catalysts have several definitive properties. First, they accelerate the rate of reactions at a given set of temperature, pressure, and concentration conditions. Secondly, a catalyst initiates reactions under conditions which would not support a reaction in the absence of the catalyst. For example, combustion catalysts initiate oxidation reactions below the ignition temperature of the reactants. Finally, catalysts are subject to poisoning or activation such that the reaction rate may vary without any variation in temperature, pressure, or composition of the reactants.

The first two properties of catalysts are quite apparent when a noncombustible mixture of materials is passed over a catalyst and the catalyst brings about a rapid reaction. However, when the materials are already of combustible concentration, and some portions of the gas in contact with a purported catalyst are above the ignition temperature, it is apparent that a reaction would be initiated whether or not the "catalyst" actually possessed any catalytic activity. In particular, when a very exothermic reaction takes place and brings about a visible glow, it is difficult to tell whether a purportedly catalytic material is, or is not, catalytic. Only by changing the gas composition to a noncombustible mixture can any real evidence of catalytic activity be obtained.

Because of the difficulty in defining a non-catalytic or inert material in terms of the first two catalytic properties discussed, the term "inert," as used herein, will be defined by reference to the third catalytic property. The third catalytic property, the variable activity of catalysts, can be used more clearly to demonstrate the presence or absence of catalytic activity. Some substances are known to poison catalysts. For example, phosphorous, arsenic, and lead, are commonly regarded as serious poisons to platinum catalysts. Therefore, if the reaction rate cannot be changed by contacting a known poisoning material with the substance thought to be "catalytic" under stable reaction conditions, then the catalytic activity of the "catalyst" substance is insignificant and that substance may be classified as inert.

In the conventional production of nitric oxide, the ammonia content of a mixture of ammonia and air in a nitric acid plant is kept below the combustible limit to prevent preignition during the mixing process. The function of the catalyst is to initiate the reaction of a mixture composition which would not otherwise react. The purpose of my invention is to permit operation in the range of compositions where combustion can occur without the assistance of a catalyst. That is, the system is operated above the lower combustible limit of ammonia in air, and above the ignition temperature. The purpose of the screen arrangement is to stabilize the burning process, and localize it on the downstream side of the upstream screen. If the upstream screen were, in fact, catalytic to any significant extent, it would initiate combustion on the upstream face as well as on the downstream face. Since the upstream face of the upstream screen is in contact with a combustible mixture of ammonia in air, this mixture would ignite and explode if the upstream screen or screens means were composed of a catalytic material rather than an inert material. This, of course, would render the system inoperative. To preclude premature ignition the upstream screen or screen means cannot be made of any material which is catalytic, such as those currently used in the production of oxides of nitrogen. That is, material such as platinum, platinum-rhenium alloys, and platinum-rhodium alloys may not be used in the construction of the inert heat resistant heat barrier screen or the inert upstream screen means located directly downstream from the heat sink.

There is no such restriction on the downstream or reverberatory screen means. This downstream screen means may be composed of any heat resistant material. Both the upstream and the downstream heat resistant screens may be composed of such inert, non-catalytic materials as iron (coated with alumina to prevent oxidation of the screen), tungsten, tungsten carbide, iron tungsten alloys, Monel, Inconel, other nickel alloys, iron-chromium alloys, iron-chromium-nickel alloys, iron-titanium alloys, ceramic-metallic materials, and other equivalent substances. The chemical composition of the screens is of little importance as long as the screens are heat resistant to temperatures of about 1750° F. The materials of which the screens are made must also be capable of being formed into a screen, either directly or by a coating onto a screen frame.

The primary advantage of my invention is that the requirement for an expensive catalyst no longer exists. This immensely reduces the cost of the production of nitric oxide by eliminating capital outlays necessary to obtain catalytic gauze and by eliminating the expense of recovering the catalyst particles which are broken loose from the gauze. This reduction in the cost of nitric oxide will substantially reduce the cost of producing nitric acid. Another advantage of my invention, resulting from the absence of a catalyst, is that because a catalytic screen is not required, the problem of "poisoning," that is, the attacking and coating of the catalyst by contaminants, is eliminated completely.

In connection with the oxidation of ammonia, it is usually desirable to cool or "quench" the gas stream leaving the oxidation zone to prevent dissociation of the nitric oxide formed. This dissociation represents a net loss of product nitric acid and is completely undesirable. The more pronounced and rapid the cooling, the greater will be the yield of nitric acid per unit of ammonia feed. It is commonly accepted that yields of .90–.95 mol $HNO_3$ per mol $NH_3$ are acceptable.

Cooling of the reaction products has another very practical advantage in the nitric acid production. Cooling the products of combustion and the incoming gas mixture results in a sizable increase in the total heat available for external use, such as production of heat and power. This is made possible since heat previously required to preheat the incoming ammonia-air mixture is now available for these purposes.

The use of the apparatus of my invention need not be limited to the production of nitric oxide, since the principal of confining heat from the combustion of explosive mixtures to prevent premature combustion can be applied to any process whereby a combustible fluid is oxidized and the resulting products of combustion recovered. Thus, closely related processes, such as the combustion of sulfur, hydrogen sulfide, and sulfur dioxide in the production of sulfuric acid, can make use of the same apparatus to a similar benefit. Likewise, the noncatalytic production of hydrocyanic acid by the oxidation of a mixture of ammonia and methane can be accomplished.

While the apparatus operates most efficiently in connection with self-sustaining exothermic reactions, the amount of heat required to oxidize a material where the oxidation is not self-sustaining is reduced by the construction of the aforesaid apparatus. Thus, my invention is economically feasible for the burning of exhaust gases from power and heating plants, chemical reaction kettles, the manufacture of paints in closed kettles, the manufacture of laminated plastics, sandpaper, coated fabrics, metal food containers, electrical laminations for motors on transformers, and in other continuous coating operations. The apparatus of my invention is also feasible for burning exhaust gases containing solvent fumes from cleaning operations, and afterburning exhaust gases from automobile engines, diesel engines, and other internal combustion engines.

In the operation of the apparatus of my invention, ammonia and air are mixed in explosive proportions upstream from a radiant heat sink. The heat sink keeps the air-ammonia mixture cool while it is in the upstream portion of the passageway. Upon passing downstream past said heat sink, the air-ammonia mixture passes through a screen means into a combustion enclosure, said combustion enclosure being bounded by an upstream and downstream screen means, both of which act as heat barriers. In this combustion enclosure the air-ammonia mixture is initially reacted by an ignition means. Once the reaction is begun it is self-sustaining. The nitric oxide containing products of combustion pass out of the enclosure through the downstream screen means where they are cooled by a heat exchanging means, which cools the passageway downstream from the downstream screen means. The products of combustion are then processed further, the nitric oxide usually being converted to nitric acid.

The various features of the apparatus of my invention are illustrated by way of one embodiment in the accompanying drawing.

Referring now to the drawing, there is shown an enlarged tubular section or vessel 1 suitable for producing nitric oxide and having an inlet 12 leading to an internal passageway 2 and an outlet 3. Downstream from the inlet 12 and within the enlarged section is a radiant heat sink which is composed of a plurality of pipe sections 8 which traverse the area of passageway 2. Preferably, the pipe sections extend through and are sealed to the walls of vessel 1 such that the pipes may be connected to a source of coolant which can circulate through the pipes absorbing heat from passageway 2. Downstream from the radiant heat sink a portion of passageway 2 is, in effect, enclosed by an inert upstream screen means 4 and an inert downstream reverberatory screen means 5. The screen means 4 and 5 are spaced apart as in the illustrated embodiment and both are both formed from an inert material and have from 20 to 200 openings per linear inch. The screen means 4 and 5 thereby both act as heat barrier means, and serve to confine the heat produced by the combustion of ammonia within the combustion enclosure 6 formed between screen means 4 and 5. An ignition means 10 is indicated as being in communication with combustion enclosure 6 by way of connection 7.

In a preferred arrangement, downstream from combustion enclosure 6 there is provided heat exchanging means to effect a quench of the reaction products. Preferably, said heat exchanging means consists of a plurality of pipe sections 9 which traverse the area of passageway 2. The pipe sections 9 extend through and are sealed into the walls of container 1 such that the pipe sections 9 may be connected to a source of coolant which can circulate through the pipes absorbing heat from passageway 2. Extending substantially around the periphery of container 1 at combustion enclosure 6 are a series of fins 11 which radiate heat conducted from combustion enclosure 6. In the embodiment shown in the drawing, there is a break in the series of fins where the ignition means 10 communicates with combustion enclosure 6.

The following examples will further illustrate this invention, but the scope of the invention should not be restricted to these examples.

EXAMPLE 1

13.8 parts by volume of ammonia and 86.2 volumetric parts of air are mixed. This is an explosive mixture of ammonia in air having a volumetric ratio of ammonia to oxygen of .765 to 1. The mixture is introduced at ambient temperature and atmospheric pressure into a passageway, where a radiant heat sink keeps the mixture cooled to a temperature of about 250° F. The mixture and heat sink at this point are subjected to the radiant heating from the heat of combustion downstream. The mixture passes into a combustion enclosure formed by an upstream screen and a downstream screen transverse to the passageway and both composed of an alloy containing from about 10% to about 30% iron, from about 10% to about 30% nickel, with the balance of the alloy being chromium. The mixture is initially ignited in the combustion enclosure by a torch or other ignition means but later is ignited by the exothermic effects of the reaction taking place in the combustion enclosure. The products of combustion, containing nitric oxide, water vapor, and other products in gaseous form are cooled downstream within one second to a temperature of about 1000° F. The resulting yield of nitric oxide after such cooling is at least about 50%.

EXAMPLE 2

The process for producing nitric oxide of Example 1 is repeated but with the following change. 20 parts by volume of ammonia are mixed with the 86.2 volumetric parts of air, instead of the quantity of ammonia described in Example 1. The volumetric ratio of ammonia to oxygen is thereby 1.11:1.

EXAMPLE 3

The process of Example 1 is repeated but with several changes. 12.4 parts by volume of ammonia and 87.6 volumetric parts of air are mixed. This is in place of the ammonia-air mixture of Example 1. As a result, the volumetric ratio of ammonia to oxygen is .676:1. The mixture is introduced into the passageway at ambient temperature but at a pressure of eight atmospheres. Also, the upstream screen of Example 1 is replaced by a screen formed of Inconel. That is, the screen is formed of an alloy of 76.0% nickel, .04% carbon, .20% manganese, 7.20% iron, .20% silicon, .10% copper, and 15.8% chromium. The downstream screen of Example 1 is replaced by a downstream reverberatory screen of iron coated with alumina ($AL_2O_3$).

EXAMPLE 4

Example 1 is repeated but with several changes. 13.0 parts by volume of ammonia and 87.0 parts by volume of air are mixed in place of the ammonia-air mixture of Example 1. The volumetric ratio of ammonia to oxygen is thereby .750:1. The mixture is introduced into the passageway at ambient temperature but at a pressure of five atmospheres. The upstream screen of Example 1 is replaced by an upstream screen formed from a titanium alloy. This alloy is composed of .07% carbon, and .30% iron, in titanium. The downstream screen of Example 1 is replaced by a downstream screen composed of tungsten carbide containing 13% cobalt. Also, the products of combustion immediately downstream from the combustion enclosure are cooled to ambient air temperature within 0.01 second. The resulting yield of nitric oxide after cooling is at least about 70%.

In all cases, the present diagrammatic drawing should not be considered limiting as to the type of construction and arrangement of equipment, type of passageway, radiant heat sink, screen means, ignition means, and heat exchanging means, or composition of screen means. Likewise, it is to be understood that the examples of the process discussed herein shall not be considered limiting except as expressly noted as to the air-ammonia ratios, ammonia percentages, pressure of the ammonia-air mixture, temperature of the ammonia-air mixture, temperature within the combustion enclosure, percentage yields of nitric oxide, and final cooled or uncooled temperature of the products of combustion.

I claim as my invention:

1. A noncatalytic process for producing nitric oxide in a manner which comprises, passing a mixture containing ammonia and oxygen in explosive proportions past a radiant heat sink, said heat sink cooling the mixture to preclude premature explosion, subsequently passing said mixture through an inert heat resistant heat barrier screen having 20 to 200 openings per linear inch into a combustion enclosure, therein effecting noncatalytic burning of the mixture within said enclosure, passing the resulting nitric oxide containing combustion products through a downstream inert heat resistant reverberatory screen having 20 to 200 openings per linear inch and out of said combustion enclosure.

2. The process of claim 1 wherein the volumetric ratio of ammonia to oxygen is .765:1 and combustion is carried out at atmospheric pressure.

3. The process of claim 1 wherein the volumetric ratio of ammonia to oxygen is .676:1 and combustion is carried out at a pressure of eight atmospheres.

4. The process of claim 1 wherein the volumetric ratio of ammonia to oxygen is .750:1 and combustion is carried out at a pressure of five atmospheres.

5. The process of claim 1 wherein said mixture of oxygen and ammonia is maintained at a temperature upstream from said heat exchanging source of no greater than about 350° F.

6. The process of claim 1 wherein said nitric oxide containing combustion products are cooled to decrease the degree to which the nitric oxide dissociates.

7. The process of claim 6 wherein said combustion products are cooled to below a temperature of about 1000° F.

8. The process of claim 1 wherein said heat barrier screen and said reverberatory screen are each comprised of iron coated with alumina.

9. The process of claim 1 wherein said heat barrier screen and said reverberatory screen are each comprised of an iron-chromium-nickel alloy.

10. The process of claim 1 wherein said heat barrier screen and said reverberatory screen are each comprised of a tungsten-carbide alloy.

11. A noncatalytic process for producing nitric oxide in a manner which comprises, passing a mixture containing ammonia and oxygen in explosive proportions past a radiant heat sink, said heat sink cooling the mixture, to preclude premature explosion, subsequently passing said mixture through an iron-chromium-nickel alloy heat barrier screen having 20 to 200 openings per linear inch into a combustion enclosure, therein effecting the noncatalytic burning of the mixture within said enclosure, passing the resulting nitric oxide containing combustion products through a downstream iron-chromium-nickel alloy reverberatory screen means having 20 to 200 openings per linear inch and out of said combustion enclosure.

References Cited
UNITED STATES PATENTS

| | | | |
|---|---|---|---|
| 1,193,796 | 8/1916 | Landis | 23—162 |
| 1,270,989 | 7/1918 | Taliani | 23—162X |
| 1,322,291 | 11/1919 | Classen | 23—162 |
| 1,850,129 | 3/1932 | Fischer et al. | 23—162 |

OSCAR R. VERTIZ, Primary Examiner

G. O. PETERS, Assistant Examiner